(12) United States Patent
Skou et al.

(10) Patent No.: US 9,580,826 B2
(45) Date of Patent: Feb. 28, 2017

(54) METHOD FOR RECOVERING PLATINUM GROUP METALS FROM CATALYTIC STRUCTURES

(71) Applicant: Syddansk Universitet, Odense M (DK)

(72) Inventors: Eivind Skou, Odense SØ (DK); Casper Noergaard, Frederiksberg (DK); Serban Nicolae Stamatin, Bucharest (RO)

(73) Assignee: Syddansk Universitet, Odense M (DK)

( * ) Notice: Subject to any disclaimer, the term of this patent is extended or adjusted under 35 U.S.C. 154(b) by 0 days.

(21) Appl. No.: 14/784,056

(22) PCT Filed: Apr. 9, 2014

(86) PCT No.: PCT/DK2014/050083
§ 371 (c)(1),
(2) Date: Oct. 13, 2015

(87) PCT Pub. No.: WO2014/166494
PCT Pub. Date: Oct. 16, 2014

(65) Prior Publication Data
US 2016/0032472 A1    Feb. 4, 2016

(30) Foreign Application Priority Data
Apr. 11, 2013   (DK) .................................. 2013 70205

(51) Int. Cl.
*C22B 11/00*   (2006.01)
*C25C 1/20*    (2006.01)
(Continued)

(52) U.S. Cl.
CPC .................. *C25C 1/20* (2013.01); *C22B 3/44* (2013.01); *C22B 11/04* (2013.01); *C22B 11/048* (2013.01);
(Continued)

(58) Field of Classification Search
CPC .............. C25C 1/20; C25C 5/02; C22B 11/48
See application file for complete search history.

(56) References Cited

U.S. PATENT DOCUMENTS 4,775,452 A    10/1988   Kuninaga et al.
5,156,721 A    10/1992   Whewell
(Continued)

FOREIGN PATENT DOCUMENTS

EP          363314 A1    4/1990
JP        60184647 A     9/1985
WO   WO 2008/060038 A1   5/2008

OTHER PUBLICATIONS

English Abstract of JP60184647A by Espacenet on Jan. 17, 2013.
(Continued)

*Primary Examiner* — Arun S Phasge
(74) *Attorney, Agent, or Firm* — Woodard, Emhardt, Moriarty, McNett & Henry LLP

(57) ABSTRACT

A method for recovering platinum group metals from a catalytic structure, such as a fuel cell membrane electrode assembly, involving dissolution of the platinum group metal by treating the catalytic structure in an electrolytic cell with a suitable electrolyte containing a complexing agent and introducing an electric current into the electrolytic cell; and subsequently re-precipitating the platinum group metal by increasing the pH of the electrolyte system and adding a reducing agent.

14 Claims, 5 Drawing Sheets

(51) Int. Cl.
 C25C 5/02 (2006.01)
 C22B 3/44 (2006.01)
 C22B 3/00 (2006.01)
(52) U.S. Cl.
 CPC ............... *C25C 5/02* (2013.01); *Y02P 10/214* (2015.11); *Y02P 10/234* (2015.11)

(56) References Cited

U.S. PATENT DOCUMENTS

| | | | |
|---|---|---|---|
| 5,797,977 A | 8/1998 | Narita | |
| 6,183,545 B1 * | 2/2001 | Okuhama | C22B 3/0051 106/1.18 |
| 2009/0301260 A1 | 12/2009 | Shore et al. | |
| 2010/0288079 A1 | 11/2010 | Shore et al. | |
| 2012/0318678 A1 | 12/2012 | Choi et al. | |

OTHER PUBLICATIONS

Esmaeilifar et al.: "Synthesis methods of low-Pt-loading electrocatalysts for proton exchange membrane fuel cell systems," Energy, vol. 35, No. 9, pp. 3941-3957, Sep. 2010.

Garsany et al.: "Impact of film drying procedures on RDE characterization of Pt/VC electrocatalysts," J. Electroanal. Chem., vol. 662, No. 2, pp. 396-406, Nov. 2011.

Grot et al.: "DOE Hydrogen Program—FY 2005 Progress Report—VII.E.1 Platinum Recycling Technology Development," New Castle, 2005.

Handley et al.: "Impact of the European Union vehicle waste directive on end-of-life options for polymer electrolyte fuel cells," J. Power Sources, vol. 106, No. 1-2, pp. 344-352, Apr. 2002.

Machine Translation of EP363314A1 by Lexis Nexis Total Patent on Dec. 29, 2015.

Norgaard, et al., Electrochemical Recovery of Platinum from PEM Fuel Cell Electrodes, University of Southern Denmark.

Renner et al.: "Platinum Group Metals and Compounds," in Ullmann's Encyclopedia of industrial Chemistry vol. 28, Weinheim: Wiley-VCH Verlag GmbH & Co. KGaA, 2012, pp. 318-388.

Shore et al.: "DOE Hydrogen Program—FY 2005 Progress Report—VII.E.2 Platinum Group Metal Recycling Technology Development," Iselin, 2005.

Teranishi et al.: "Size Control of Monodispersed Pt Nanoparticles and Their 2D Organization by Electrophoretic Deposition," J. Phys. Chem. B, vol. 103, No. 19, pp. 3818-3827, May 1999.

Xu et al.: "Recycling of membrane electrode assembly of PEMFC by acid processing," Int. J. Hydrogen Energy, vol. 35, No. 7, pp. 2976-2979, Apr. 2010.

Zhao et al.: "Reclaim/recycle of Pt/C catalysts for PEMFC," Energy Convers. Manag., vol. 48, No. 2, pp. 450-453, Feb. 2007.

* cited by examiner

METHOD FOR RECOVERING PLATINUM GROUP METALS FROM CATALYTIC STRUCTURES

CROSS-REFERENCE TO RELATED APPLICATIONS

This application is the U.S. national stage application of International Patent Application No. PCT/DK2014/050083, filed Apr. 9, 2014, which claims priority of DK PA 2013 70205, filed Apr. 11, 2013, which are both hereby incorporated by reference.

FIELD OF THE INVENTION

The present invention relates to a method for recovering platinum group metals from a catalytic structure, such as a fuel cell membrane electrode assembly. Specifically the method involves dissolution of the platinum group metal by treating the catalytic structure with a suitable electrolyte containing a complexing agent and introducing an electric current into the electrolytic cell and subsequent reprecipitation of the platinum group metal.

BACKGROUND OF THE INVENTION

Noble metals such as the platinum group metals are in general use as catalysts for automotive exhaust gas purification, organic chemical reactions, as well as fuel cell electrodes. They are also constituents of electronic parts. The recovery of noble metals from used materials is important due to their rarity and expense.

This has hitherto been by the dissolution process. In this process, the metals are dissolved with the carriers in hot concentrated sulfuric acid or an oxidizing acid mixture such as aqua regia, and the metals are separated from the solution by addition of a reducing agent or by electrolyzing the solution in low current density electrolytic cell. In the former case, the noble metals separate out in the solution, while in the latter case they are deposited on the cathode.

The dissolution process requires a hazardous, highly oxidizing acid that is difficult to handle, and a large amount of heat to maintain the acid temperature. Additionally, aqua regia, long been used for noble metals dissolution, gives off $NO_x$ producing pollution treatment problems. Cyanides, such as sodium cyanide, are effective for noble metals dissolution, but need careful handling and adequate liquid waste treatment due to their high toxicity.

In addition, the dissolution process is uneconomical in noble metals recovery from noble metal catalysts, because it involves the treatment of a large amount of carrier containing solutions as well as noble metals. (Noble metal catalysts are composed of carriers such as carbon, silica and alumina and very small amounts of noble metals therein. Moreover, at times a portion of noble metal is present as oxides, barely soluble in aqua regia. In such cases, it is necessary to reduce the noble metal oxides before dissolution, or perform the dissolution process in two steps, i.e., noble metal dissolution in acid and noble metal oxide dissolution in alkali.

Fuel Cells are devices that release electrical energy using an electrochemical reaction. A major class of fuel cells utilizes hydrogen fuel, and the electrochemical oxidation of hydrogen as well as the electrochemical reduction of oxygen to water is catalyzed using electrodes containing precious metal catalysts. Precious metal catalytic elements for use in precious metal catalysts include, but are not limited to, platinum (Pt), ruthenium (Ru), palladium (Pd), gold (Au), and rhodium (Rh). It is widely accepted that the high cost and limited supply of platinum and other catalytic elements are obstacles to large scale commercialization of fuel cells.

There are several types of fuel cells. Most common is the polymer electrolyte membrane (PEM) fuel cell. The PEM forms the basis for a membrane electrode assembly (MEA), which is the structure by which hydrogen can be oxidized to generate electricity. An anode (i.e., a negative electrode) is provided on one side of the PEM and a cathode (i.e., a positive electrode) is provided on the opposite side of the PEM. The anode contains a catalyst, typically comprising platinum, for promoting dissociation of hydrogen into electrons and positive hydrogen ions. The cathode also contains a catalyst, typically comprising platinum, for promoting reduction of oxygen. An MEA typically carries a catalytic element loading in the order of a few $mg/cm^2$. Typically, these loadings in current commercial fuel cells translate to about 0.5% to 2.0% by weight of catalytic element in the MEA.

A commonly used polymer electrode membrane is Nafion™ by E.I. DuPont de Nemours Company. Nafion™, a Teflon™-based polymer, is a sulfonated perfluropolymer. Even when using a membrane that is itself free of fluorine, a perfluropolymer ionomer is typically mixed into the electrocatalyst layers (i.e., the anode and the cathode) to improve the mobility of the positive hydrogen ions. Additionally, the presence of the perfluorinated polymer makes the powder of the MEA hydrophobic when the MEA is ground.

In one type of fuel cell, the anode and cathode are coated onto the PEM to form a catalyst coated membrane (CCM). A CCM fuel cell can include platinum, ruthenium, and other catalytic elements. In another type of fuel cell, the anode and cathode catalyst materials are coated onto their respective carbonaceous gas diffusion layers toto form gas diffusion electrodes (GDE), which are then sandwiched around the PEM. A GDE fuel cell can also include platinum, ruthenium, and other catalytic elements. The gas diffusion layers provide for the uniform distribution of hydrogen and oxygen to their respective sides of the PEM, provide a conductive pathway for electricity to be transmitted out of the fuel cell, and provide a porous means for the water produced by the electrochemical reaction to be transported away.

Another type of fuel cell using catalytic elements such as platinum is an alkaline fuel cell (AFC). Still another type of fuel cell using catalysts is a phosphoric acid fuel cells (PAFC), which use a poly-benzylimidazole (PBI) membrane saturated with phosphoric acid electrolyte. Regardless of the type, after a period of use, a fuel cell often must be replaced, due to fouling of the catalyst, or for another reason. In particular, after repeated cycling of the fuel cell during operation (i.e., cycling between periods of high and low voltage generation), the catalyst can tend to migrate into the membrane and the catalytic element particles can become altered in size and therefore less effective. Rather than simply disposing of a fuel cell that must be replaced, it is highly desirable to recover as much catalytic element as possible from the MEA, due to the value of the precious metal.

The conventional approach to recover platinum and other precious metal catalytic elements from an MEA includes combusting the PEM and the carbonaceous diffusion layers, dissolving the resultant ash in acid, and purifying the precious metal using standard refining chemistry. However, the high fluorine content of the MEA, particularly those with Nafion™ or other Teflon™-based membranes, results in toxic emissions of hydrogen fluoride gas (HF) and other fluorine compounds from the combustion process.

To dissolve and recover the platinum catalyst, the majority of available methods use hydrochloric acid leaching media assisted by a chemical oxidant such as nitric acid (i.e. aqua regia), halogen gas (e.g. $Cl_2$, $Br_2$), and even hydrogen peroxide [1,2]. The platinum chloro complexes thus obtained are subsequently extracted by solvent extraction processing, stripped from the organic phase by water and possibly precipitated as $(NH_4)_2PtCl_6$ in fairly high purity (99.95%) by addition of ammonium chloride to the aqueous phase [3]. Possible emissions to air from this type of processing include ammonia, chlorine, hydrogen chloride and nitrogen dioxide. The described industrial process is, seemingly, designed with the intention of recovering the noble metal catalyst as pure salts that can be traded. This line of thought is also followed in platinum catalyst recycling schemes specifically considered for polymer electrolyte membrane fuel cells [4-8].

Several methods exist for the preparation of supported and unsupported noble metal catalysts based on these commercially available salts [9].

EP0363314A1 describes a method for recovery of precious metals such as platinum, palladium and rhodium used as catalysts. The method comprises dissolving the metals by placing them in a solution comprising an electrolyte such as hydrochloric acid and electrolysing the solution. The pure metals are precipitated by adding a reducing agent to the solution. EP0363314A1 does not disclose an integrated process for obtaining the metals in a catalytic structure.

There is a need for a more simple method for recovery of precious metals in catalytic structures.

SUMMARY OF THE INVENTION

The present inventors have surprisingly found a very simple way to overcome the above problems of the prior art by dissolving platinum metal electrochemically and subsequently redepositing it as nanoparticles on a carbon substrate or reprecipitating the platinum in the same solution. This circumvents the need for a chemical oxidizing agent in recycling of platinum catalyst. Hence, the present invention provides a combination of electrochemical dissolution and re-precipitation.

The subject of the present invention is also an alternative approach to platinum recycling from catalytic structures such as discarded fuel cell membrane-electrode-assemblies. The idea is to bring platinum into solution electrochemically, thus avoiding the consumption of bulk chemical oxidizing agents and the associated emissions to air. Furthermore, the intention is to limit the need for purification of platinum from the medium by reprecipitating platinum as nanoparticles on fresh carbon substrate immediately from the acid solution with minimal pretreatment. The present invention provides a method for recycling platinum group metals from a catalytic structure, comprising the steps of:

dissolving the platinum group metal by treating the catalytic structure in an electrolytic cell with a suitable electrolyte including a complexing agent and introducing an electric current into the electrolytic cell; and re-precipitating the platinum group metal by increasing the pH of the electrolyte system and adding a reducing agent.

As discussed in the detailed description of the invention it is the aim of the invention that the platinum group metal and the electrolyte are not separated prior to re-precipitation of platinum on the catalytic structure. This renders the present invention much more simple and feasible than prior art methods.

The platinum may be re-precipitated as pure noble metal catalyst powder or as part of an alloy or re-deposited directly on a support material.

Preferably, re-precipitation of the platinum group metal is obtained by adjusting the pH of the electrolyte system and adding a reducing agent.

In a preferred embodiment of the present invention the platinum group metal is re-precipitated as pure noble metal catalyst powder, or as part of an alloy or re-deposited directly on a support material.

Preferably the electrolyte system pH is adjusted according to the conditions of the re-precipitation method chosen.

The complexing agent may be any ligand system with donor atoms belonging to either the carbon group, such as cyanides; alkynes, alkenes, aromatics, or the groups of pnictogens, such as amines, phosphenes, arsenes, chalcogens or halogens.

The reducing agent is preferably selected from liquid organic compounds, such as glycols, aldehydes, alcohols, antioxidants, and formic acid.

In a preferred embodiment the electrolyte may further comprise a wetting agent, such as an ionic surfactant (e.g. sodium dodecyl sulfate) or nonionic surfactant (e.g. polyvinylpyrrolidone), in order to improve the contact between the electrolyte and the catalytic structure.

DETAILED DESCRIPTION OF THE INVENTION

Figure 1:
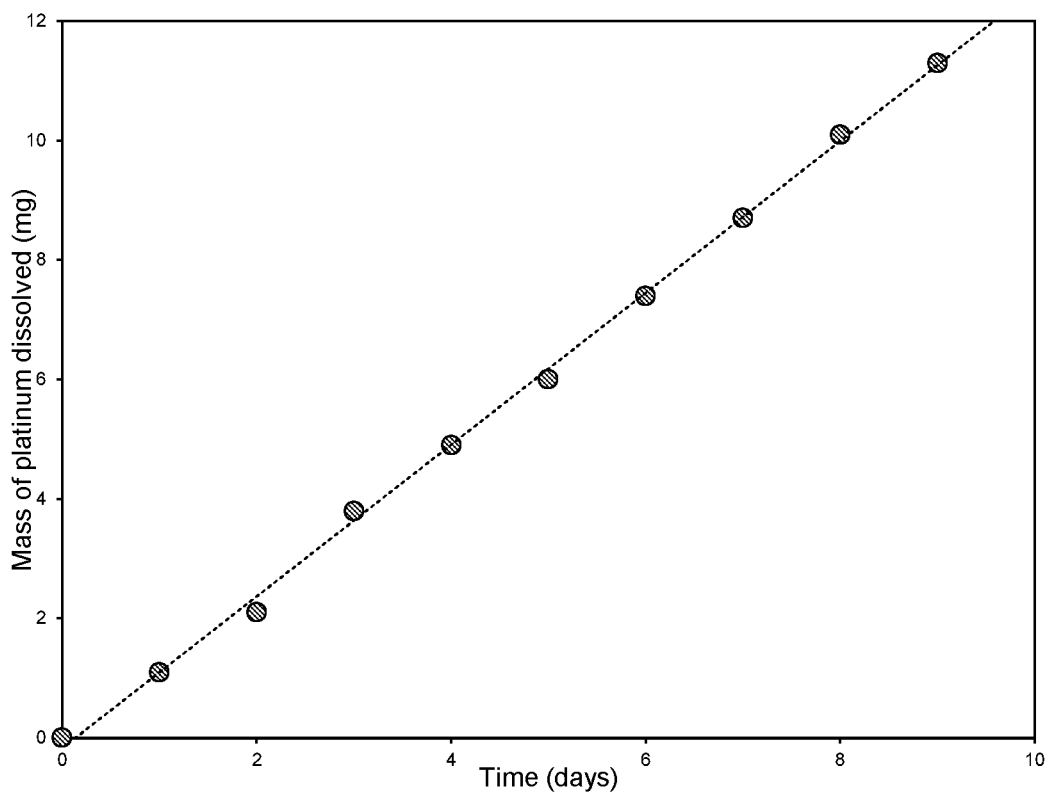
FIG. 1 shows the mass of platinum dissolved by potential cycling in 1 M HCl electrolyte versus time.

In the following a specific embodiment of the present invention is described in more detail.

The concept of the present invention is to first bring platinum into solution electrochemically and then use the resulting solution directly for re-deposition of platinum nanoparticles on a carbon substrate is investigated. In this example pure platinum wire was dissolved by a potentiodynamic treatment in dilute hydrochloric acid electrolyte. Pure platinum was selected in order not to pollute the solution with corroded contacts or substrate, and to enable a simple gravimetric way of monitoring the amount of platinum dissolved.

The platinum containing solution was then used for re-deposition with no other pretreatment than a simple pH adjustment using sodium hydroxide. Ethanol was used as the solvent and reducing agent in order to reduce the dissolved platinum to platinum nanoparticles. A commercial carbon support material was added to the reaction mixture in order to nucleate platinum directly on carbon. This facilitated the collection and handling of the platinum nanoparticles and minimized the losses upon transfer.

The platinum on carbon material obtained was characterized by cyclic voltammetry, thermogravimetric analysis and powder x-ray diffraction for the detection, quantification and particle size estimation of platinum. Furthermore, UV-vis spectrophotometry was carried out on the platinum containing 1 M HCl electrolyte used for the re-deposition, in order to gain insight on the form in which platinum was dissolved.

Electrochemical Dissolution of Platinum

Platinum wire (d=0.3 mm, Dansk Ædelmetal A/S) was used as the working electrode in a three-electrode electrochemical setup along with a graphite rod as counter electrode and a Radiometer REF401 standard calomel reference electrode. 30 ml of 1 M HCl (Hydrochloric acid 37%, ACS reagent grade, Sigma-Aldrich) was used as the electrolyte. In this electrochemical cell, the platinum wire was subjected to potential cycles between 0.55 V and 1.3 V vs. SHE (standard hydrogen electrode) at a scan rate of 100 mV·s$^{-1}$. The conditions were controlled by a custom build potentiostat. The amount of platinum dissolved was monitored by periodic weighing of the platinum wire.

The dissolution was stopped when the mass loss from the platinum wire reached 11 mg.

Re-Deposition of Platinum Nanoparticles on Carbon

For the reduction of the dissolved platinum species, a modified version of a method reported by Teranishi et al. was used [27]. The electrolyte (30 ml), now containing dissolved platinum, was adjusted to pH>10 by addition of 5 M sodium hydroxide (NaOH), before being mixed with 50 ml of ethanol. Vulcan XC-72 carbon powder was added to the reaction mixture in order to enable nucleation of platinum directly on carbon. An amount of high surface area carbon (Vulcan XC-72R with 250 m$^2$/g) was added in order to produce a 20 wt. % platinum on carbon. The solution was refluxed for 2.5 hours. Argon purge was utilized in order to eliminate oxygen.

After cooling to room temperature, the mixture was centrifuged at 4500 rcf for 20 minutes. The precipitate was repeatedly washed with ultrapure water until pH of the wash water was neutral and no chloride ions could be detected by addition of 0.1 M silver nitrate ($AgNO_3$). The washed precipitate was dried overnight at 95° C.

Characterization

Cyclic voltammetry for the Pt/C sample was carried out in a three necked electrochemical cell using a rotating disk electrode setup. A Zahner® Elektrik IM6ex workstation controlled with Thales software version 2.0 was used as a potentiostat. The working electrode was a mirror polished glassy carbon rotating disc electrode with a surface area of 0.196 cm$^2$ connected to a rotating shaft from Pine Instruments. The counter electrode was a platinum wire kept in a glass tube fitted with a ceramic frit, whereas a Gaskatel dynamic hydrogen electrode was used as the reference electrode. A total volume of 220 ml of 0.5 M perchloric acid electrolyte (Suprapur grade from Sigma-Aldrich) was used. All the water used during the electrochemical characterization was of an ultrapure grade with resistance larger than 18.2 MΩ.

8 mg of platinum supported on carbon was ultrasonically dispersed in a total volume of 5 ml of ultrapure water for half an hour. A 20 μl aliquot was drop coated onto the surface of the glassy carbon electrode in order to produce a platinum loading of 30 μg/cm$^2$. The electrode was dried for approximately one hour, while mounted on the rotating shaft in its inverted position, as previously reported by Garsany et al. [28]. The electrolyte was purged with argon at a flow of 30 ml min$^{-1}$ from one hour prior to and throughout the experiment in order to produce an oxygen free electrolyte. During all the measurements the rotation speed of the electrode was maintained at 400 rpm.

The working electrode was electrochemically cleaned by potential sweeping for 20 cycles between 0 V and 1.3V vs. SHE at a scan speed of 200 mV/s. In order to measure the specific electrochemical activity, 10 cycles were recorded at 50 mV s$^{-1}$ between 50 mV and 1300 mV vs. SHE. All the measurements were compensated for 80% of the ohmic loss.

TGA/DSC analysis was carried out on a Netzsch STA449 F3 simultaneous thermal analyzer using 5 K/min heating rate with 50 ml/min of 4:1 nitrogen to oxygen gas mixture.

For powder x-ray diffraction, the Pt/C sample was dispersed in ethanol and then applied drop wise to a flat plastic sample holder in order to produce a thin film. After evaporation of the ethanol, the X-ray pattern of the sample was collected on a Siemens D5000 powder diffractometer with a Cu Kα radiation source. The XRD pattern was recorded from 20° to 85° with a step size of 0.020° and 10 seconds per step.

UV-visual absorption spectra of the platinum solutions were collected on a Shimadzu UV-1650PC UV-Visible spectrophotometer using quartz cells. The samples were referenced to 1 M HCl.

Referring to FIG. 1 there is shown the mass of platinum dissolved by potential cycling in 1 M HCl electrolyte versus time. The dissolution of platinum by potential cycling in 1 M HCl electrolyte, as monitored by periodic weighing of the platinum wire working electrode, is illustrated in FIG. 1. The dissolution rate is constant throughout the experiment.

Figure 2:
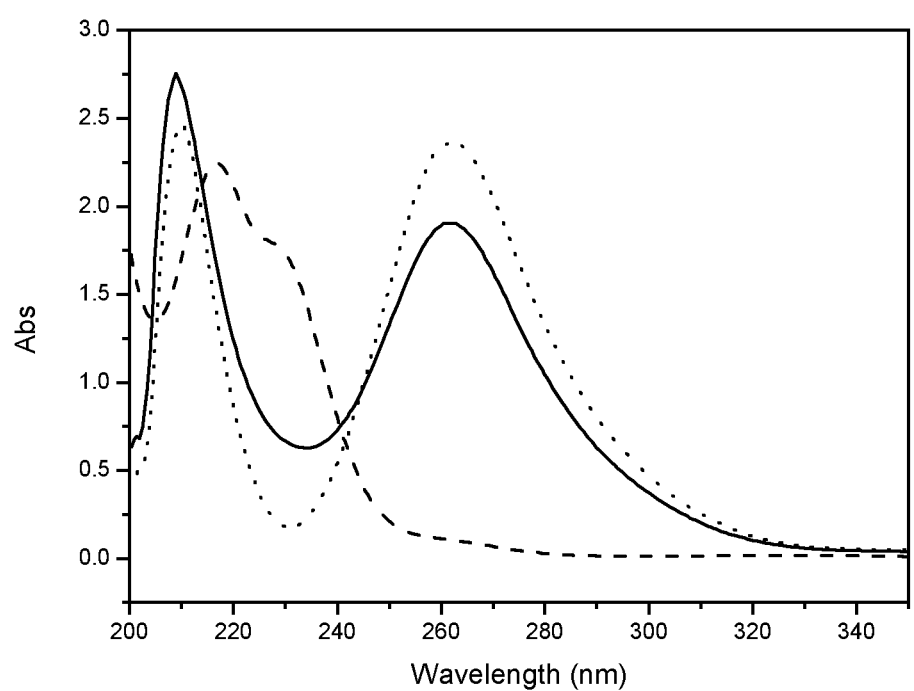
FIG. 2 shows UV-visual absorption spectra of the aqueous phase a) at the end of the platinum dissolution experiment (solid line), b) containing solutions of $K_2PtCl_4$ (dashed line) and $H_2PtCl_6$ (dotted line) diluted in 1 M HCl.

Referring to FIG. 2 there is shown UV-visual spectrophotometry of the aqueous phase a) at the end of the platinum dissolution experiment, b) containing solutions of $K_2PtCl_4$ and $H_2PtCl_6$ diluted in 1 M HCl. In order to shed light on the form in which platinum is dissolved, UV-visual spectrophotometry of the platinum solution in 1 M HCl was carried out before and after platinum redeposition on carbon (see FIG. 2). UV-visual spectra of aqueous solutions of potassium tetrachloroplatinate and hexachloroplatinic acid diluted in 1 M HCl were also recorded. Whereas, the Pt(II) salt gives rise to an absorption peak at 217 nm with a shoulder at 228 nm, the Pt(IV) acid exhibits absorption peaks at 210 nm and 262 nm, which are coinciding with the peak positions found for the platinum electrochemically dissolved in 1 M HCl.

Figure 3:
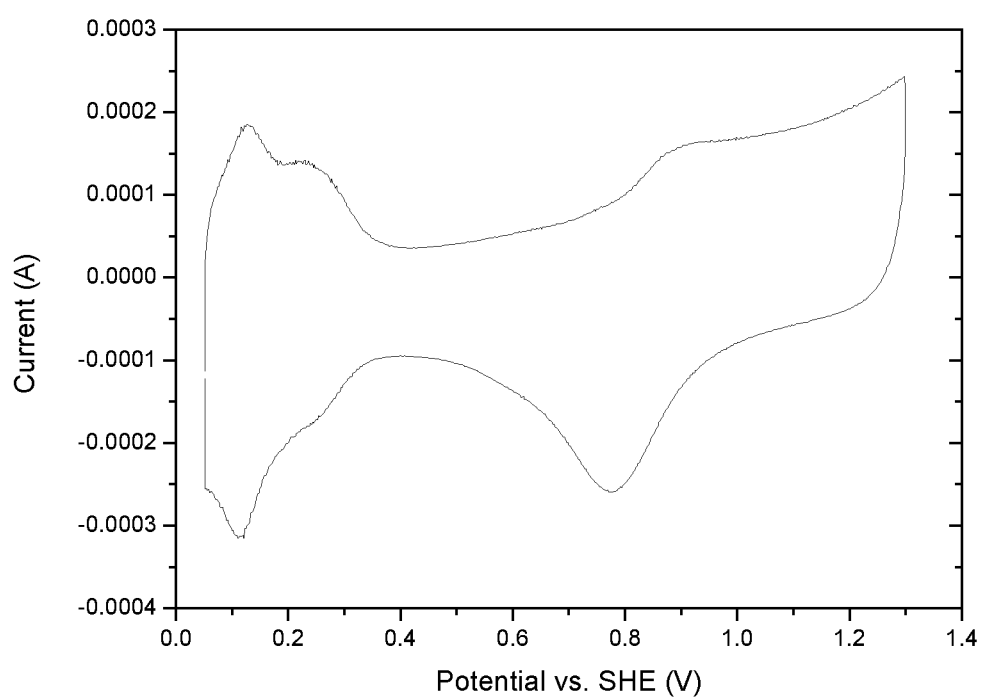
FIG. 3 shows a cyclic voltammogram of the re-deposited Pt/C catalyst.

Referring to FIG. 3 there is shown cyclic voltammogram of the re-deposited Pt/C catalyst. The purpose of the cyclic voltammetry on the fabricated Pt/C catalyst was to detect platinum by revealing its well-known features: hydrogen adsorption and desorption, platinum oxide formation and platinum oxide reduction. These features are clearly found in FIG. 3, confirming the presence of platinum on the carbon substrate. Moreover, the hydrogen desorption region can be used to estimate the specific electrochemical surface area (ECSA) of the platinum supported on carbon, which serves to evaluate the platinum particle size under the assumption of perfectly spherical particles. The specific electrochemical surface area (ECSA) is found as the ratio between the electrochemical surface area and the mass of platinum in the thin film electrode. The electrochemical surface area is in turn found by integration of the hydrogen desorption region followed by correction for the double layer charge contribution and use of the assumption of 210 μC per cm$^2$ of platinum surface area with full hydrogen monolayer coverage. In this case, the ECSA amounts to 43 m$^2$/g.

Figure 4:
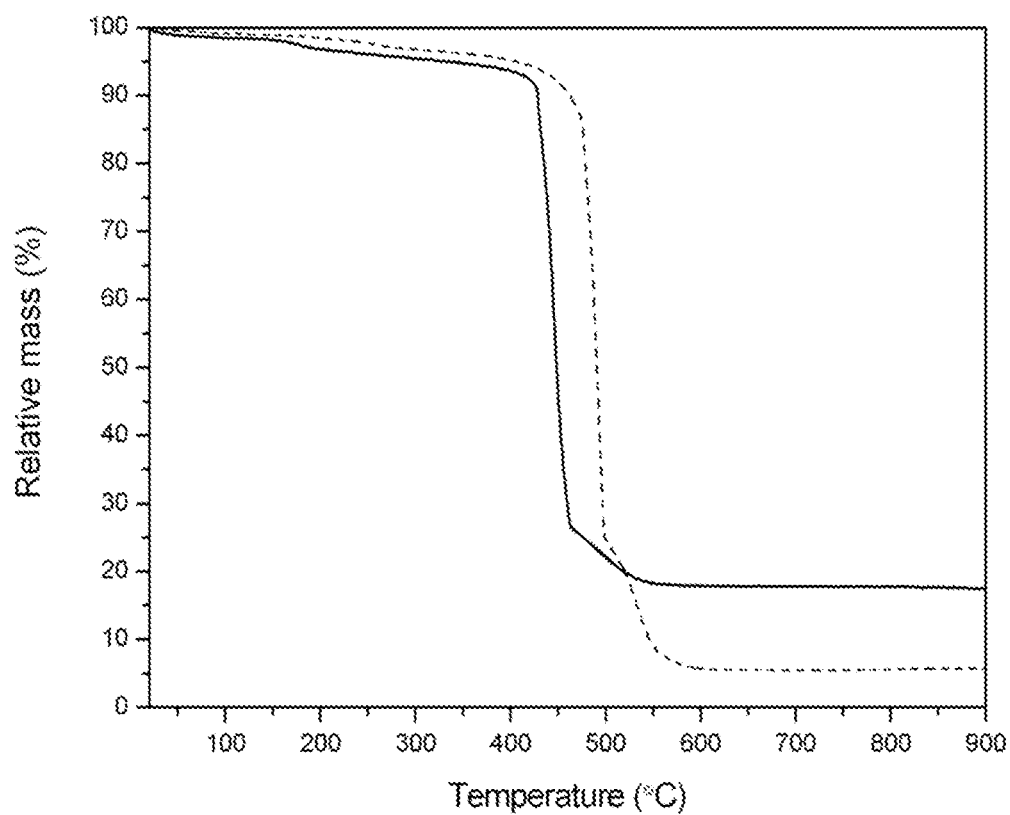
FIG. 4 shows thermogravimetric analysis of re-deposited Pt/C catalysts obtained with (solid line) and without (dashed line) increase of pH prior to platinum reduction.

Referring to FIG. 4 there is shown thermogravimetric analysis on re-deposited Pt/C catalysts.

The amount of platinum loaded on carbon was quantified by thermogravimetric analysis. The samples were heated in 1:4 oxygen to nitrogen atmosphere to combust the carbon and leave behind the platinum residue (see FIG. 4). Assuming that the residue after heating to 900° C. is pure platinum, the platinum loading is approximately 17.8 wt %, when the mass at 125° C. is taken as the dry weight of the Pt/C sample. FIG. 4 also shows data for a Pt/C sample obtained without increasing the pH prior to platinum re-deposition, in which case the platinum loading on carbon was much lower (5.6 wt %).

Figure 5:
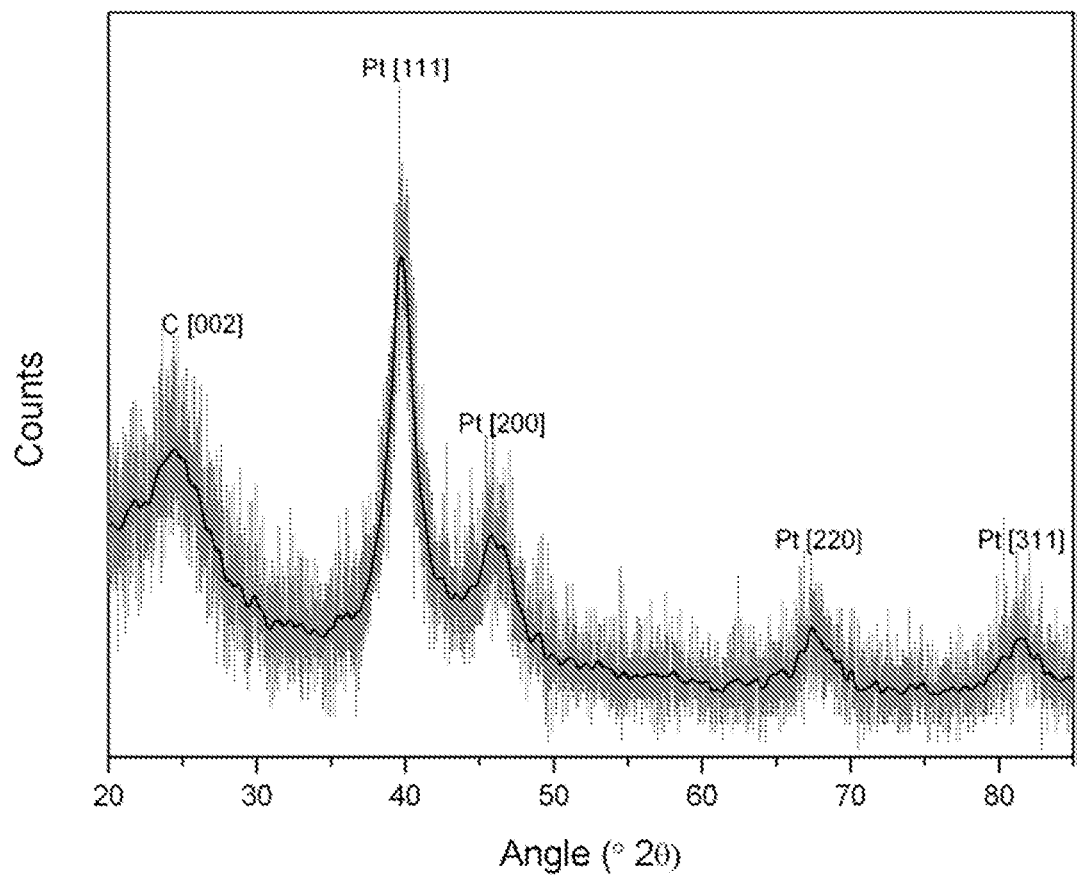
FIG. 5 shows XRD pattern of platinum re-deposited on carbon. Raw data (grey line) and smoothed curve (black line).

Referring to FIG. 5 there is shown XRD pattern of platinum re-deposited on carbon. Raw data (grey line) and smoothed curve (black line). In order to estimate the size of the platinum particles, powder x-ray diffraction patterns were collected (FIG. 5). Peaks are found at 39.8, 46.0, 67.7, as well as 81.5° 2θ which respectively correspond to reflections from the 111, 200, 220 and 311 crystallographic planes of the platinum face-centered cubic lattice. Using the Scherrer equation, the average size of the crystalline domains is 4-5 nm, which can be considered a lower limit on the actual platinum particle size.

REFERENCES

[1] H. Renner, G. Schlamp, I. Kleinwäcther, E. Drost, H. M. Lüschow, P. Tews, P. Panster, M. Diehl, J. Lang, T. Kreuzer, A. Knödler, K. A. Starz, K. Dermann, J. Rothaut, R. Drieselmann, C. Peter, and R. Schiele, "Platinum Group Metals and Compounds," in *Ullmann's Encyclopedia of industrial Chemistry Vol. 28*, Weinheim: Wiley-VCH Verlag GmbH & Co. KGaA, 2012, pp. 318-388.

[2] J. Zhao, X. He, J. Tian, C. Wan, and C. Jiang, "Reclaim/recycle of Pt/C catalysts for PEMFC," *Energy Convers. Manag.*, vol. 48, no. 2, pp. 450-453, February 2007.

[3] C. Handley, N. P. Brandon, and R. van der Vorst, "Impact of the European Union vehicle waste directive on end-of-life options for polymer electrolyte fuel cells," *J. Power Sources*, vol. 106, no. 1-2, pp. 344-352, April 2002.

[4] L. Shore, R. Matlin, and R. Heinz, "Efficient process for precious metal recovery from fuel cell membrane electrode assemblies," US2009/0301260 A12009.

[5] L. Shore, R. Matlin, and R. Heinz, "Method for recovering catalytic elements from fuel cell membrane electrode assemblies," US 2010/0288079 A12010.

[6] F. Xu, S. Mu, and M. Pan, "Recycling of membrane electrode assembly of PEMFC by acid processing," *Int. J. Hydrogen Energy*, vol. 35, no. 7, pp. 2976-2979, April 2010.

[7] L. Shore, B. Robertson, A. Anderson, D. Peterson, and T. G. Benjamin, "DOE Hydrogen Program—FY 2005 Progress Report—VII.E.2 Platinum Group Metal Recycling Technology Development," Iselin, 2005.

[8] S. Grot, W. Grot, A. Anderson, and R. Tyler, "DOE Hydrogen Program—FY2005 Progress Report—VII.E.1 Platinum Recycling Technology Development," New Castle, 2005.

[9] A. Esmaeilifar, S. Rowshanzamir, M. H. Eikani, and E. Ghazanfari, "Synthesis methods of low-Pt-loading electrocatalysts for proton exchange membrane fuel cell systems," *Energy*, vol. 35, no. 9, pp. 3941-3957, September 2010.

[10] T. Teranishi, M. Hosoe, T. Tanaka, and M. Miyake, "Size Control of Monodispersed Pt Nanoparticles and Their 2D Organization by Electrophoretic Deposition," *J. Phys. Chem. B*, vol. 103, no. 19, pp. 3818-3827, May 1999.

[11] Y. Garsany, I. L. Singer, and K. E. Swider-Lyons, "Impact of film drying procedures on RDE characterization of Pt/VC electrocatalysts," *J. Electroanal. Chem.*, vol. 662, no. 2, pp. 396-406, November 2011.

The invention claimed is:

1. A method for recycling platinum group metals from a catalytic structure, comprising the steps of:
   a) dissolving the platinum group metal by treating the catalytic structure in an electrolytic cell with a suitable electrolyte including a complexing agent and introducing an electric current into the electrolytic cell; and
   re-precipitating from said electrolyte including a complexing agent the platinum group metal by increasing the pH of the electrolyte system and adding a reducing agent;
   wherein the platinum group metal and the electrolyte are not separated prior to re-precipitation of platinum on the catalytic structure;
   wherein said current is a bias for dissolving platinum with a constant potential with intermittent pulses of lower potential for reestablishing the state of the surface of the catalytic structure; and
   wherein said current is not an alternating current.

2. A method according to claim 1, wherein the electrolyte further comprises a wetting agent.

3. A method according to claim 2 wherein said wetting agent, comprises an ionic surfactant or a nonionic surfactant.

4. A method according to claim 1, wherein the platinum group metal is re-precipitated as pure noble metal catalyst powder, or as part of an alloy or re-deposited directly on a support material.

5. A method according to claim 1, wherein the platinum group metal is re-precipitated on a suitable substrate by nucleating the platinum group metal directly on the desired substrate structure.

6. A method according to claim 5 wherein said structure comprises carbon particles.

7. A method according to claim 1, wherein the electrolyte system pH is adjusted according to the conditions of the re-precipitation method chosen.

8. A method according to claim 1, wherein the complexing agent is any ligand system with donor atoms belonging to either the carbon group or the groups of pnictogens.

9. A method according to claim 8 wherein said carbon group comprises one or more members selected from the group consisting of cyanides, alkynes, alkenes, and aromatics.

10. A method according to claim 8 wherein said pnictogen comprises one or more members selected from the group consisting of amines, phosphenes, arsenes, chalcogens, and halogens.

11. A method according to claim 1, wherein the reducing agent is selected from liquid organic compounds.

12. A method according to claim 11 wherein said liquid organic compound comprises one or more members selected from the group consisting of glycols, alcohols, antioxidants, and formic acid.

13. A method according to claim 1, wherein the electrolytic cell is subjected to a suitable potential profile for dissolving the noble metal in the chosen electrolyte system.

14. A method according to claim 1 wherein said current cycles between 0.55V and 1.3 V.

* * * * *